(12) United States Patent
Yamamoto et al.

(10) Patent No.: US 6,295,866 B1
(45) Date of Patent: Oct. 2, 2001

(54) SURFACE-TRACKING MEASURING MACHINE

(75) Inventors: Takeshi Yamamoto; Takenori Akaike, both of Kawasaki (JP)

(73) Assignee: Mitutoyo Corporation, Kawasaki (JP)

( * ) Notice: Subject to any disclaimer, the term of this patent is extended or adjusted under 35 U.S.C. 154(b) by 0 days.

(21) Appl. No.: 09/383,990

(22) Filed: Aug. 26, 1999

(30) Foreign Application Priority Data

Sep. 2, 1998 (JP) .................................................. 10-248421

(51) Int. Cl.⁷ ........................... G01B 7/28; G01B 7/34; G01B 21/20; G01B 21/30
(52) U.S. Cl. ........................... 73/105; 33/501.04; 33/551; 33/556; 33/558; 33/558.4; 33/561; 33/572
(58) Field of Search ........................... 73/105; 33/501.02, 33/501.03, 501.04, 551, 554, 556, 558, 558.01, 558.4, 559, 561, 572

(56) References Cited

U.S. PATENT DOCUMENTS

| | | | |
|---|---|---|---|
| 2,363,691 | * 11/1944 | Reason | 73/105 |
| 4,074,438 | * 2/1978 | Takeda | 33/561 |
| 4,141,148 | * 2/1979 | Noguchi | 33/561 |
| 4,359,892 | 11/1982 | Schnell et al. | 73/105 |
| 4,574,625 | * 3/1986 | Olasz et al. | 73/105 |
| 5,146,690 | 9/1992 | Breitmeier | 73/105 |
| 5,309,755 | * 5/1994 | Wheeler | 73/105 |
| 5,705,741 | 1/1998 | Eaton et al. | 73/105 |

FOREIGN PATENT DOCUMENTS

3152731 * 7/1983 (DE) ..................................... 73/105

* cited by examiner

Primary Examiner—Daniel S. Larkin
(74) Attorney, Agent, or Firm—Oliff & Berridge, PLC

(57) ABSTRACT

A surface-tracking measuring machine is provided, in which measurement range is enlarged while keeping a measuring force, responsivity, resolution thereof. For the object, the surface-tracking measuring machine has a frame (10), a probe (11) swingably supported by the frame (10) and having a tracer (15) at an end thereof, a measuring force controller (21) for controlling the measuring force applied to the probe, a displacement detector (31) for detecting a displacement of the probe, a measuring force detector (41) for detecting the measuring force applied to the probe, and a controller (51) for comparing a measuring force detected value detected by the measuring force detector and a previously commanded measuring force command value and to control the measuring force controller so that the measuring force detected value is equal to the measuring force command value.

27 Claims, 9 Drawing Sheets

F I G. 4
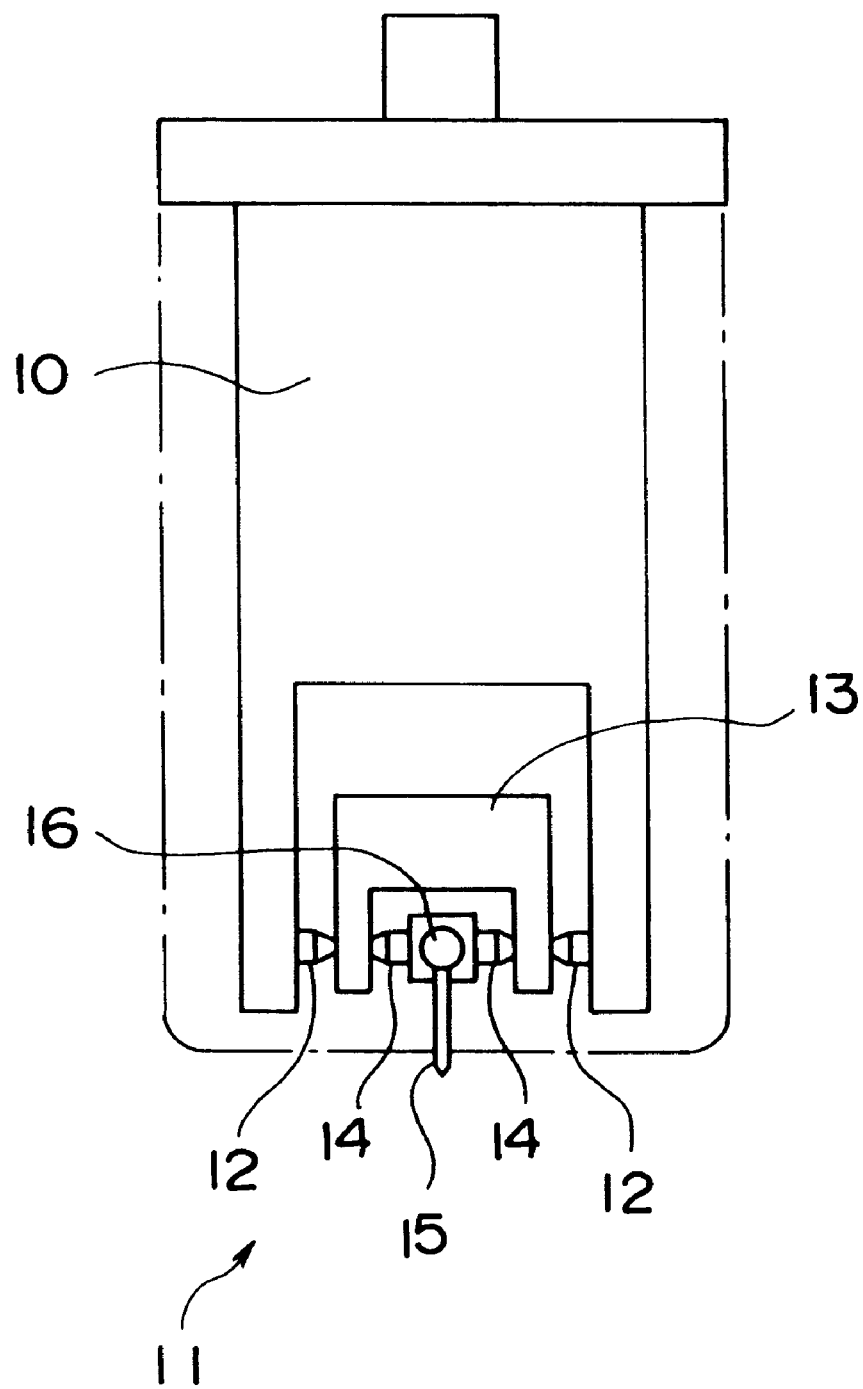

FIG. 9
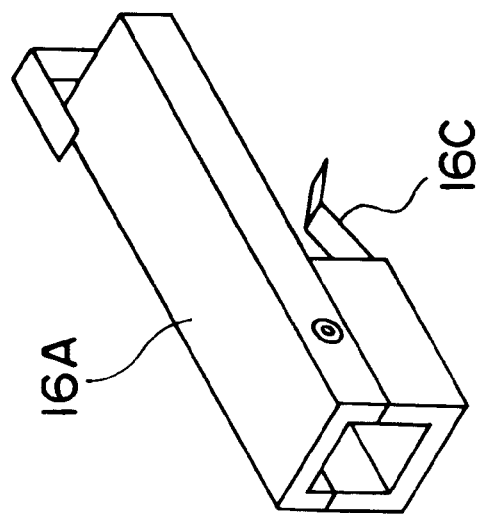
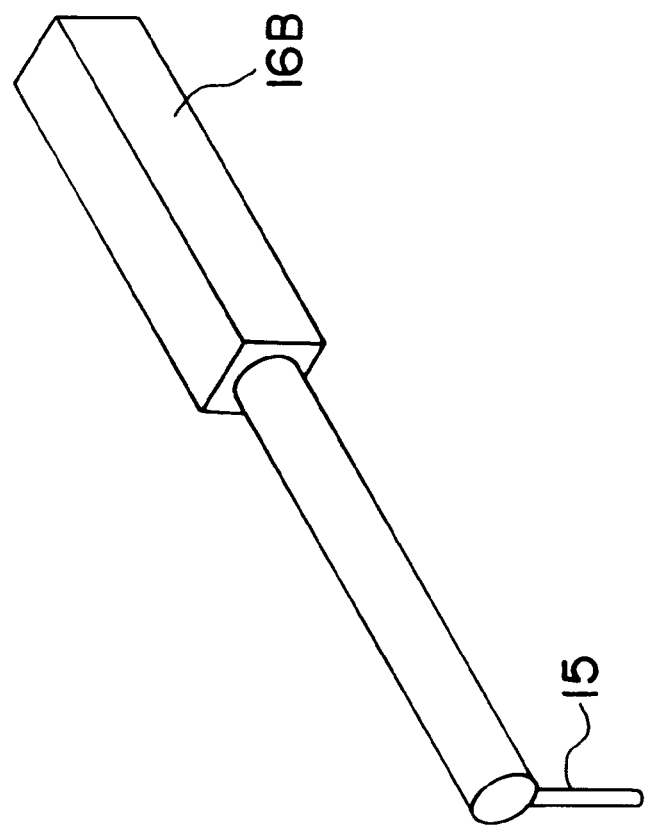

SURFACE-TRACKING MEASURING MACHINE

BACKGROUND OF THE INVENTION

1. Field of the Invention

The present invention relates to a surface-tracking measuring machine. More specifically, the present invention relates to a surface-tracking measuring machine for measuring a surface roughness and a profile of a workpiece by relatively moving both a tracer and the workpiece while abutting the tracer onto a surface of the workpiece.

2. Description of Related Art

A tracer-type surface roughness measuring machine is known as a measuring machine for measuring a surface roughness of the workpiece.

The tracer-type surface roughness measuring machine includes a main body, a probe swingably supported by the main body and having a tracer at an end thereof, a biasing device for biasing the tracer of the probe to touch the surface of the workpiece, a moving device for moving the probe in a direction approximately orthogonal with the tracer, and a displacement sensor for detecting a swing displacement amount of the probe.

In measuring the surface roughness of the workpiece, the probe is moved along the surface of the workpiece by the moving device while the tracer of the probe is in contact with the surface of the workpiece, and the swing displacement amount is detected by the displacement sensor. The surface roughness of the workpiece can be obtained by the swing displacement amount and the amount of movement of the probe.

Generally speaking, the following performance is required for the tracer-type surface roughness measuring machine.

First, a low measuring force for preventing scratch marks on the surface of the workpiece.

Second, good tracking ability for the tracer to accurately trace the sectional curve.

Third, high-resolution for detecting minute concave and convex features on the surface of the workpiece.

Conventionally, a spring is used as the biasing device for biasing the tracer of the probe to the surface of the workpiece. However, in order to lower the measuring force in accordance with the above first condition, the magnitude of the biasing device is limited.

Accordingly, in order to obtain the necessary tracking ability, the size and weight of the probe has to be reduced as much as possible. Further, the displacement sensor for detecting the swing displacement amount of the probe has to be selected from sensors, such as a differential transformer, a strain gauge, a capacitive sensor, and an optical lever, which applies less load for actuating the probe.

Ordinarily, the measurement range of the tracer-type surface roughness measuring machine is around 1 mm. According to a conventional arrangement, when the measurement range is to be solely widened, some kind of deterioration in performance such as deterioration of the resolution of the displacement sensor, deterioration of responsivity on account of increase of movable portion weight, and increased fluctuation of measuring force is inevitable, which results in difficulty in enlarging the measurement range.

Accordingly, the conventional tracer-type surface roughness measuring machine can not also be used as a profile measuring machine for measuring the profile of the workpiece. In other words, the surface roughness of the workpiece has to be measured by the surface roughness measuring machine and the profile of the workpiece has to be measured separately by the profile measuring machine.

SUMMARY OF THE INVENTION

An object of the present invention is to overcome the aforesaid disadvantages and to provide a surface-tracking measuring machine, in which a measurement range can be enlarged while keeping a measuring force, responsivity, and resolution for enabling surface-roughness measurement. A surface-tracking measuring machine according to the present invention is characterized in having: a main body movable relative to a workpiece; a probe displaceably supported by the main body and having a tracer at an end thereof; a measuring force controller for controlling a measuring force applied to the probe; a displacement detector for detecting a displacement of the probe; a measuring force detector for detecting the measuring force applied to the probe; and a controller for comparing a measuring force detected value detected by the measuring force detector and a previously commanded measuring force command value to control the measuring force detected value to be equal to the measuring force command value.

In the above, the probe may be supported by the main body to be linearly displaceable, or alternatively, may be swingably supported.

According to the above arrangement, when the main body and the workpiece relatively moves while the tracer of the probe is in contact with the surface of the workpiece, the tracer of the probe traverses the surface of the workpiece, so that the probe is displaced according to the surface roughness and the profile configuration of the workpiece. Then, the displacement is detected by the displacement detector and the surface roughness and the profile configuration of the workpiece can be measured by the detected value.

In the above, since the measuring force controller is controlled so that the measuring force detected value is equal to the previously commanded measuring force command value, the measuring force applied to the probe can be made constant (at a level of previously commanded measuring force command value) within the entire measurement range. Accordingly, since a detecting means having a heavy movable portion requiring a large driving force for moving thereof and high resolution in a wide measurement range can be used as the displacement detector for detecting the displacement of the probe, the measurement range can be enlarged while keeping high responsivity and high resolution. Accordingly, the surface roughness and the profile of the workpiece can be measured with a single measuring machine.

In the present invention, though any arrangement is possible for the probe, the probe preferably includes a first lever swingably supported by the main body through a first lever rotation shaft and a second lever swingably supported by the first lever at an intermediate portion thereof through a second lever rotation shaft disposed coaxially with the first lever rotation shaft, the second lever having the tracer at an end thereof, a rear end of the second lever and the first lever being connected by a connecting member.

According to the above arrangement, since the first lever rotation shaft and the second lever rotation shaft are disposed coaxially, a centroid position of the second lever is not moved by a swing movement of the first lever.

In the aforesaid arrangement having the first and the second lever, the second lever is preferably swingably supported by the first lever through the second lever rotation shaft at a centroid position thereof. Accordingly, a vertical and horizontal vibration acceleration from floor or a feeding mechanism is not converted into a rotation moment of the second lever.

Further, the measuring force applied only to the second lever can be accurately detected by using a strain gauge constituting the measuring force detector as the connecting member. In other words, since the strain gauge does not detect external vibrations, the sensitivity can be lowered against external vibrations.

In the present invention, though any configuration is possible as the measuring force controller as long as the measuring force controller can minutely change the measuring force applied to the probe, the measuring force controller preferably includes a movable member slidably provided to the main body and connected to the first lever and an actuator for sliding the movable member.

In the aforesaid arrangement having the first lever, the movable member, and the actuator, a link using a plate spring is preferably used for connecting the first lever and the movable member for transmitting the swing of the first lever accurately to the movable member. The actuator may be driven by any signal, such as electricity and fluid.

The displacement detector preferably has a scale attached to the movable member and a detector fixed to the main body opposite to the scale retaining a predetermined gap therebetween, so that the displacement of the probe can be accurately detected.

A balancing device for canceling at least a weight of the movable member and the scale is preferably provided in the present invention. Accordingly, since the weight of the movable member and the scale is not required to be supported by the actuator, the driving force of the actuator and heat generation from the actuator can be reduced.

The balancing device preferably includes a counterbalance having a weight at least corresponding to the weight of the movable member and the scale, the counterbalance being configured to be movable in a direction opposite to a sliding direction of the movable member. Accordingly, the inertial force of the movable member can be canceled, thereby being unlikely to exert influence to the outside and unlikely to be influenced from the outside.

BRIEF DESCRIPTION OF THE DRAWINGS

FIG. 4 is a side elevation showing the internal structure of the sensing device of the aforesaid embodiment;

FIG. 9 is an illustration of the second lever of the aforesaid embodiment being composed of two members.

DETAILED DESCRIPTION OF PREFERRED EMBODIMENT(S)

An embodiment of the present invention will be described below with reference to the drawings.

Figure 1:
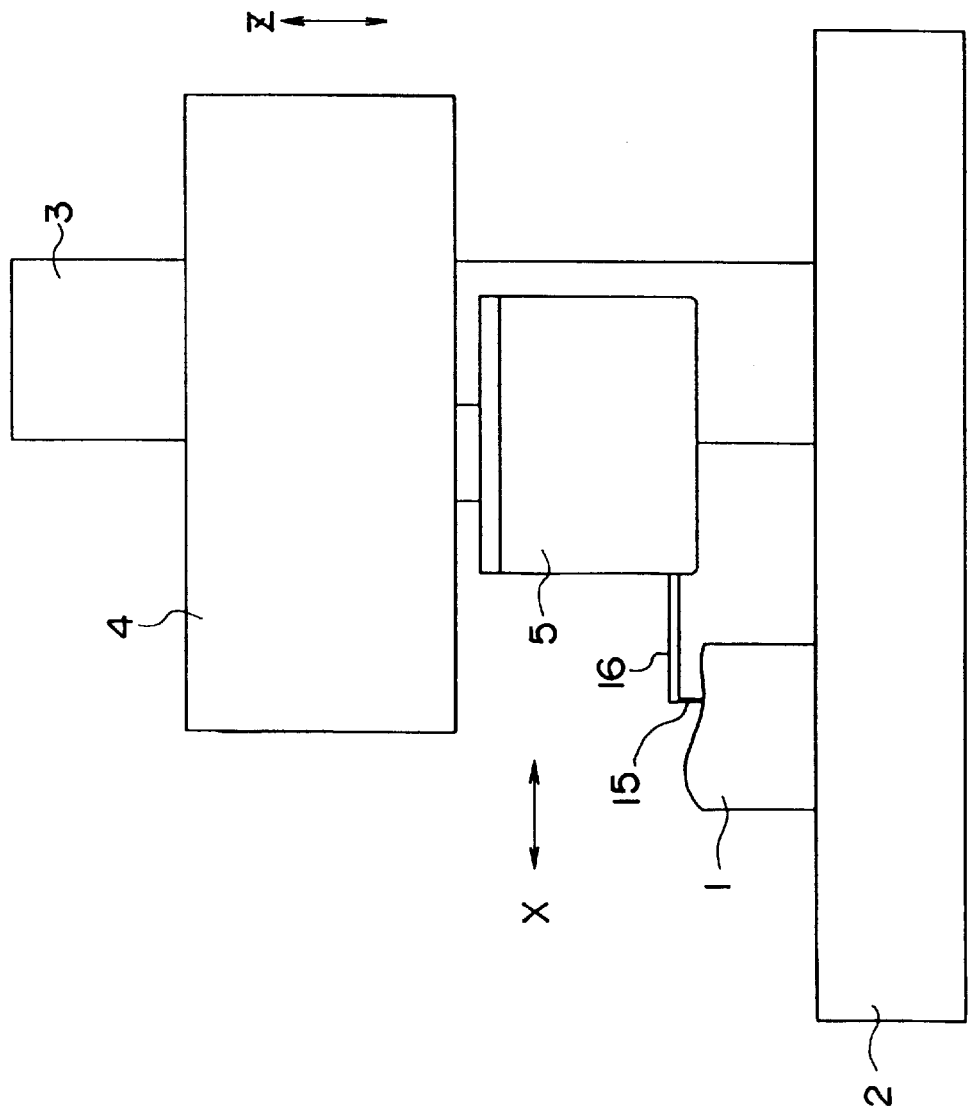
FIG. 1 is a front elevation showing an embodiment of the surface-tracking measuring machine according to the present invention.

FIG. 1 shows a surface-tracking measuring machine according to the present embodiment. The surface-tracking measuring machine has a table 2 for disposing the workpiece 1 thereon, a column 3 provided on the table 2, a sensing device feeder 4 elevatable in the vertical direction (Z direction) along the column 3, and a sensing device 5 connected under the sensing device feeder 4 and moved in a direction (X direction) orthogonal with the column 3 by the sensing device feeder 4.

Figure 2:
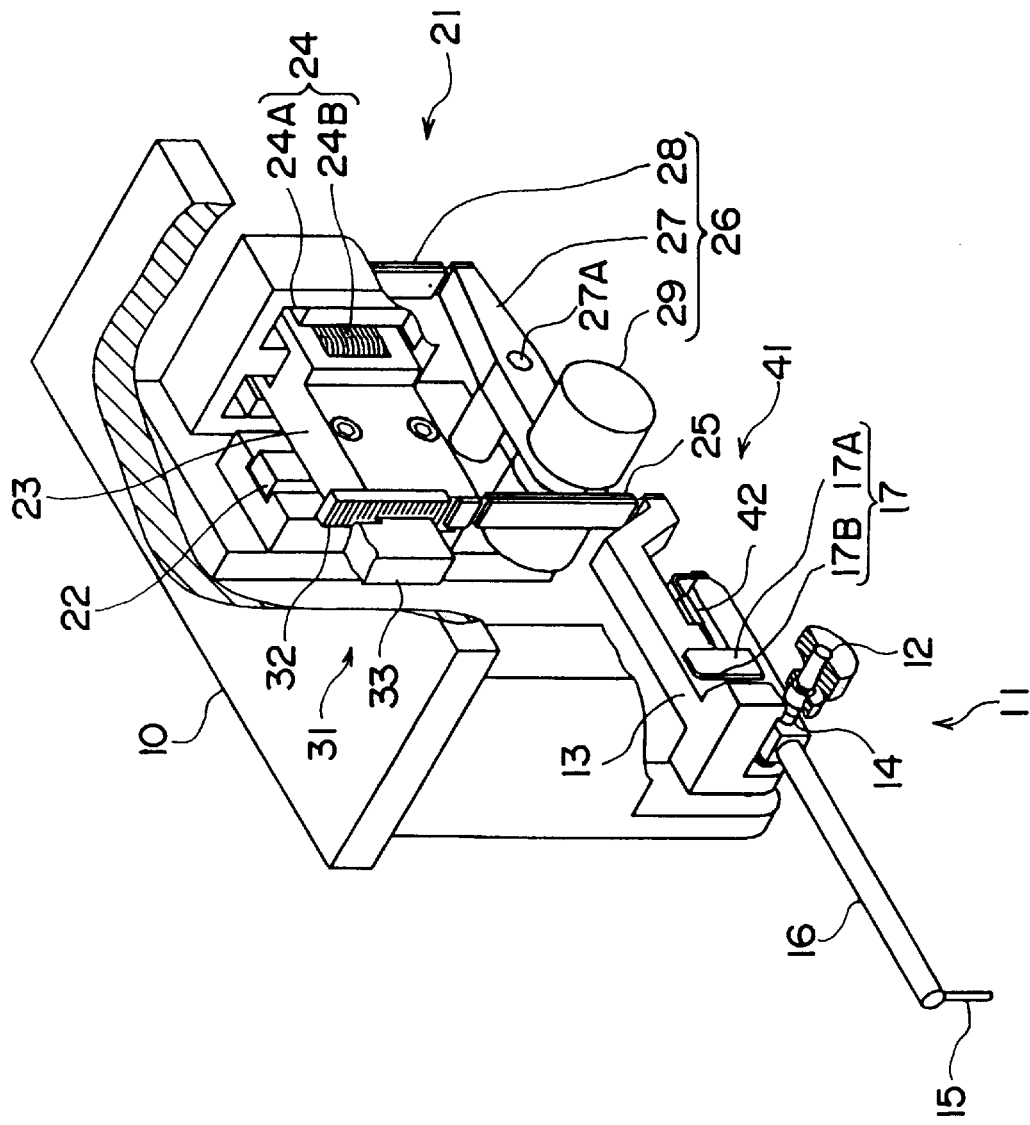
FIG. 2 is a perspective view showing the internal structure of a sensing device of the aforesaid embodiment.
Figure 3:
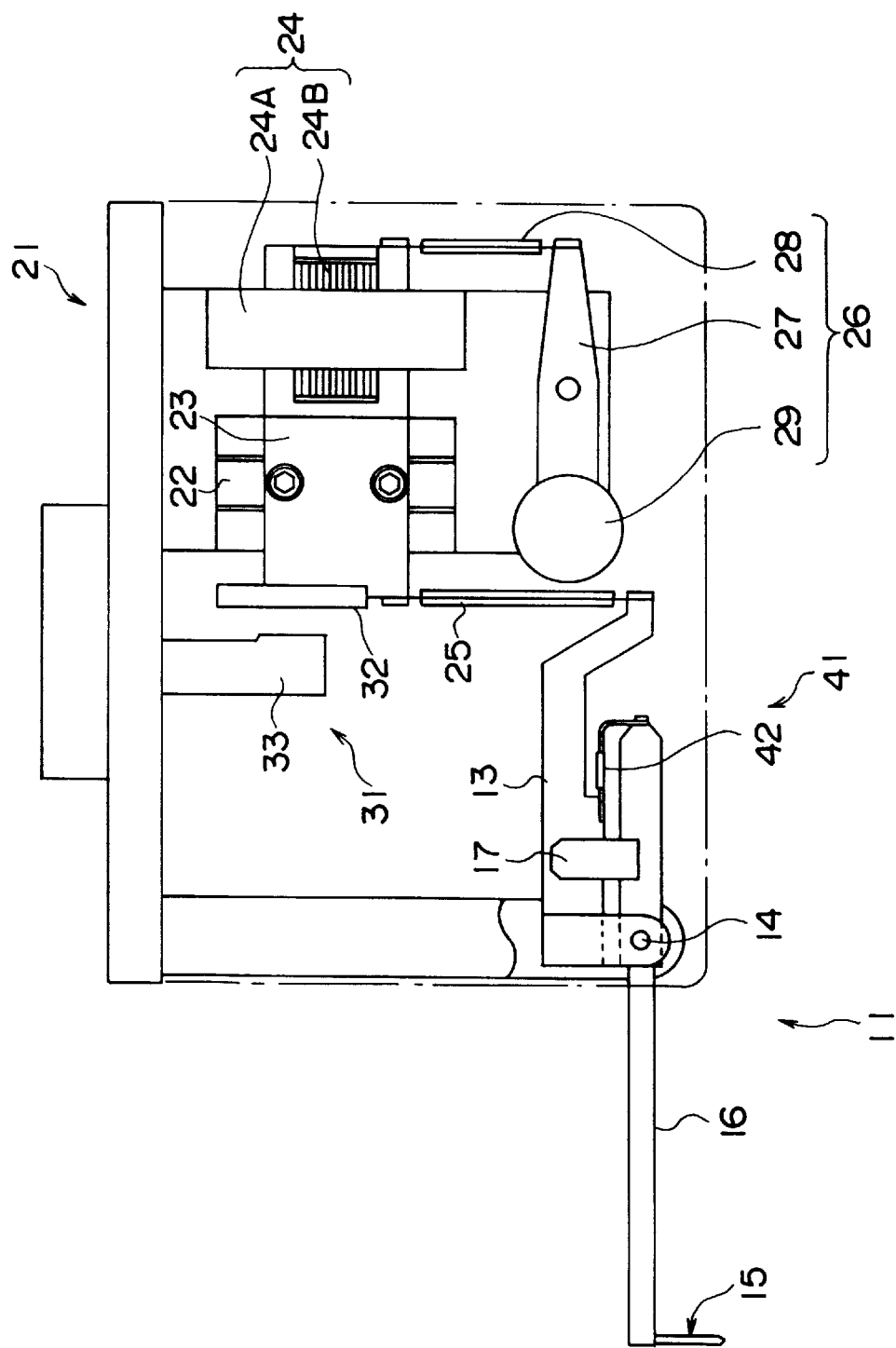
FIG. 3 is a front elevation showing the internal structure of the sensing device of the aforesaid embodiment.

As shown in FIGS. 2, 3 and 4, the sensing device 5 has a frame 10 as a main body connected to the sensing device feeder 4. The frame 10 has a probe 11 having a tracer 15 at an end thereof, a measuring force controller 21 for controlling the measuring force applied to the probe 11, a displacement detector 31 for detecting the displacement of the probe 11, and a measuring force detector 41 for detecting the measuring force applied to the probe 11.

The probe 11 has a first lever 13 supported swingably in the vertical direction (Z direction) through a first lever rotation shaft 12 and a second lever 16 supported at a front end of the first lever 13 swingably in vertical direction (Z direction) through a second lever rotation shaft 14 and having the tracer 15 at an end thereof. A strain gauge 42 composing the measuring force detector 41 and working as a connector is attached between a rear end of the second lever 16 and an approximate center of the first lever 13.

In order to accurately detect the measuring force, the second lever rotation shaft 14 supports the centroid position of the second lever 16 for preventing the strain gauge 42 from detecting a vibration acceleration in the vertical and horizontal direction from a floor and feeding mechanism converted into a rotation moment of the second lever 16, i.e. for lowering sensitivity against external vibration. Further, the first lever rotation shaft 12 and the second lever rotation shaft 14 are aligned coaxially so as not to move the centroid position of the second lever 16 by the swing movement of the first lever 13.

A dampener 17 is provided between the first lever 13 and the second lever 16. The dampener 17 is for curbing the vibration of the second lever 16, which is composed of a plate 17A having a lower end secured to a side of the second lever 16 and an upper end opposing a side of the first lever 1 spaced apart with a small gap and a viscous fluid 17B provided to the gap between the plate 17A and the side of the first lever 13.

The measuring force controller 21 includes a movable member 23 provided to the main body 10 slidable in the vertical direction through a linear guide 22 and an actuator 24 for sliding the movable member 23 in the vertical direction (Z direction).

The movable member 23 and the rear end of the first lever 13 are connected by a link 25 sandwiching both sides of the plate spring by plates. The actuator 24 is composed a voice coil made of a magnet 24A secured to the frame 10 and a coil 24B provided to the movable member 23. According to the above arrangement, when the movable member 23 moves in the vertical direction (Z direction), the first lever 13 is swung through the link 25, thereby synchronizingly swinging the second lever 16.

A balancing device 26 is connected to the movable member 23. The balancing member 26 is made of a beam 27 swingably supported by the frame 10 through a beam rotation shaft 27A, a link 28 for connecting an end of the beam 27 and the movable member 23 (having the same structure as the link 25), and a counterbalance 29 provided on the other end of the beam 27. The weight of the counterbalance 29 is set in proportion to the weight of the movable side component, more specifically, the movable member 23, a scale 32, the first lever 13, the links 25 and 28, etc.

The displacement detector 31 has a scale 32 fixed to the movable member 23 and a detector 33 secured to the frame 10 spaced apart from the scale 32 with a slight gap. Though the scale 32 and the detector 33 may be of any detection form as long as the displacement amount of the movable member 23 can be detected in a wide range and with high resolution, optical types, electric capacitance types, and magnetic types can be preferably used.

Figure 5:
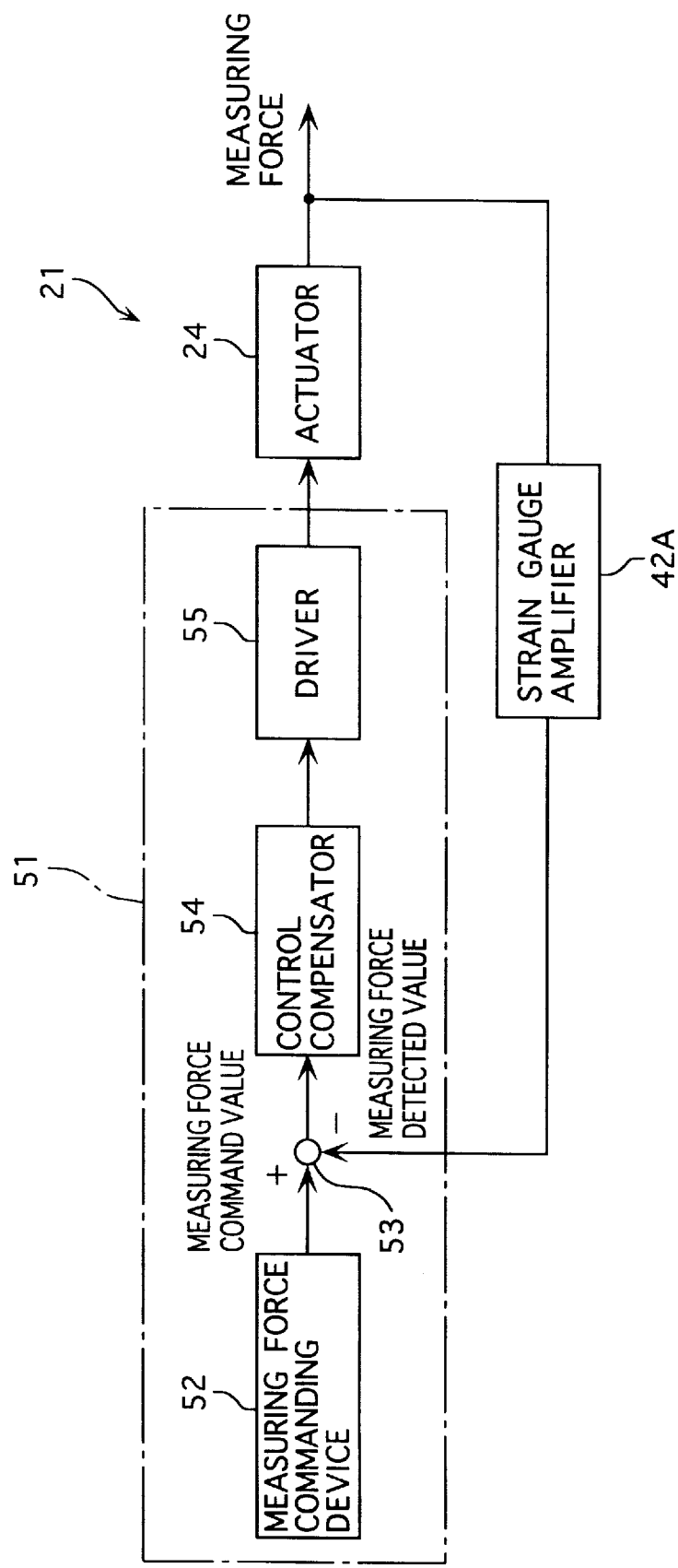
FIG. 5 is a block diagram showing a controller of the aforesaid embodiment.

FIG. 5 shows a controller 51 for comparing the measuring force detected value detected by the measuring force detector 41 and previously commanded measuring force command value to control the measuring force controller 21 so that the measuring force detected value is equal to the measuring force command value.

The controller 51 has a measuring force commanding device 52, a comparator 53 for comparing an output by a strain gauge amplifier 42A (strain gauge 42A for amplifying the measuring force detected value signal detected by the strain gauge 42) and the measuring force command value commanded by the measuring force commanding device 52, a control compensator 54, and a driver 55 for driving the actuator 24, which drives the actuator 24 so that the measuring force detected value is equal to the measuring force command value.

Next, the function of the present embodiment will be described below.

The workpiece 1 is disposed on the table 2. After setting a height position of the sensing device feeder 4 so that the tracer 15 touches the surface of the workpiece 1, the sensing device feeder 4 is driven to move the sensing device 5 in the X-direction. Then, the tracer 15 is displaced in the Z-direction while tracking the surface of the workpiece 1, and the second lever 16 is swung around a fulcrum of the second lever rotation shaft 14.

When the second lever 16 is swung, the first lever 13 connected to the second lever 16 through the strain gauge 42 is also swung around a fulcrum of the first lever rotation shaft 12. Accordingly, the swing of the first lever 13 is transmitted to the movable member 23 through the link 25 and the displacement of the movable member 23 is detected by the displacement detector 31. The surface roughness and the profile configuration of the workpiece 1 can be obtained by the detected value.

In the meantime, an expansion of the strain gauge 42 changes in accordance with a contact force of the tracer 15 and the workpiece 1, i.e. the measuring value applied to the second lever 16. The change (output of the strain gauge 42) is inputted to the controller 51 through the strain gauge amplifier 42A. The controller 51 compares the measuring force command value previously commanded by the measuring force commanding device 52 and the measuring force detected value obtained through the strain gauge amplifier 42A, and drives the actuator 24 for making the measuring force detected value equal to the measuring force command value.

Figure 6:
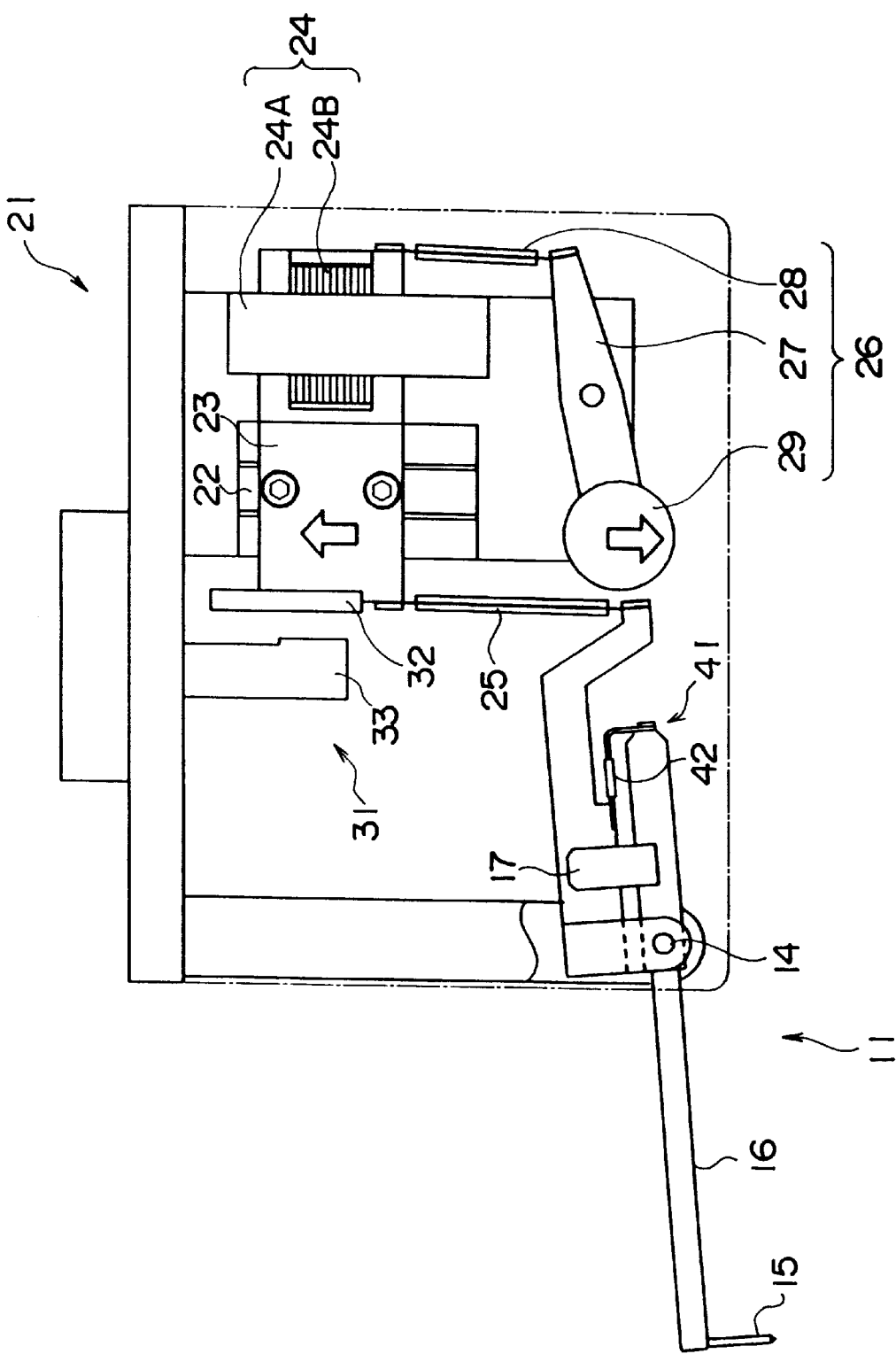
FIG. 6 is an illustration showing a displacement of a movable member and a counterbalance separating from each other.
Figure 7:
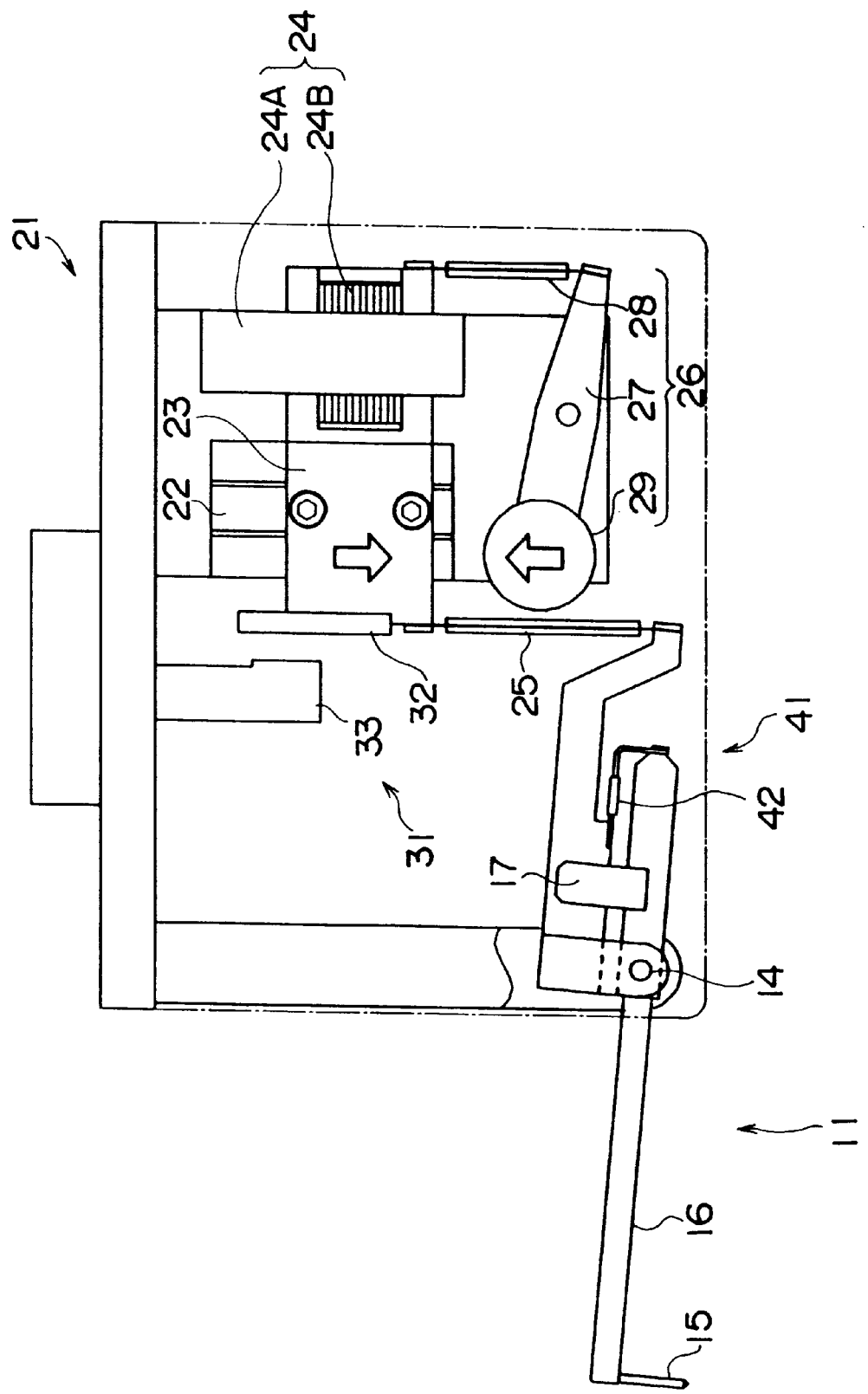
FIG. 7 is an illustration showing a displacement of the movable member and the counterbalance approaching each other.

For instance, when the measuring force detected value is smaller than the measuring force command value, the actuator 24 is driven to move the movable member 23 in an upward direction, as shown in FIG. 6. On the contrary, when the measuring force detected value exceeds the measuring force command value, the actuator 24 is driven to move the movable member 23 in a downward direction, as shown in FIG. 7. Accordingly, the measuring force detected value is controlled to be equal to the measuring force command value in the entire measurement range.

According to the present embodiment, the following effect can be obtained.

Since the measuring force applied to the second lever 16 is measured and the actuator 24 is controlled to make the measuring force detected value equal to the previously commanded measuring force command value thereafter, the measuring force applied to the second lever 16 can be always set constant in the entire measurement range.

Accordingly, since a detecting means having a relatively heavy movable portion requiring a large driving force for driving thereof and having high resolution in a wide measurement range can be used as the displacement detector 31 for detecting the displacement of the second lever 16 (probe 11), the measurement range can be widened while keeping high responsivity and high resolution.

Specifically, since the displacement detector 31 is composed of a linear displacement detector having the scale 32 linearly moving in accordance with the swing of the second lever 16 and the detector 33 oppositely disposed thereto with a predetermined gap therebetween, the measurement range can be widened while keeping the high responsivity and the high resolution. Accordingly, the surface roughness and the profile of the workpiece 1 can be measured by a single measuring machine.

Since the probe 11 has the first lever 13 swingably supported to the frame 10 through the first lever rotation shaft 12 and the second lever 16 of which intermediate portion is supported by the first lever 13 through the second lever rotation shaft 14 disposed coaxially to the first lever rotation shaft 12 and having the tracer 15 at an end thereof, the rear end of the second lever 16 and the first lever 13 being connected through the strain gauge 42, the first lever 13 swings through the strain gauge 42 when the second lever 16 swings, the swing amount being detected by the displacement detector 31, i.e. the swing amount of the second lever 16 being transmitted to the displacement detector 31 by the first lever 13 with a leverage thereof being changed, which enables the resolution to be changed and provides highly accurate detection.

At this time, since the second lever 16 is swingably supported by the first lever 13 at the centroid position thereof through the second lever rotation shaft 14, the vertical and horizontal vibration accelerations from the floor and feeding mechanism are not converted into a rotation shaft of the second lever 16. Accordingly, the strain gauge 42 does not detect the external vibrations, thereby lowering the sensitivity against the external vibrations.

Further, since the first lever rotation shaft 12 and the second lever rotation shaft 14 are coaxially disposed, the centroid position of the second lever 16 is not moved by the swing movement of the first lever 13.

Since the measuring force controller 21 includes the movable member 23 slidably provided to the frame 10 through the linear guide 22 and connected to the first lever 13 through the link 25 and the actuator 24 for sliding the movable member 23, the measuring force can be changed by driving the actuator 24 to slide the movable member 23. Further, since the actuator 24 is made of the voice coil composed of the magnet 24A and the coil 24B, the measuring force can be minutely controlled with a simple arrangement.

Since the balancing device 26 for canceling the weight of the movable member 23 and the scale 32 are provided, the weight of the movable member 23 and the scale 32 is not necessary to be supported by the actuator 24, thereby reducing the driving force and heat generated from the actuator 24.

Especially, since the balancing device 26 has the counterbalance 29 having weight corresponding to the weight of the movable member 23 and the scale 32, and the counterbalance 29 moves in a direction opposite to the sliding direction of the movable member 23, the inertial force of the movable member 23, etc. can be canceled, thereby being unlikely to exert influence to the outside and unlikely to be influenced from the outside.

Incidentally, the scope of the present invention is not restricted to the above embodiment but includes following modifications, etc.

Though the probe 11 is made of the first lever 13 and the second lever 16 in the above embodiment, the probe 11 may be made of a single lever. In this case, the probe 11 can be swingably supported by the frame 10 at the centroid position thereof.

Figure 8:
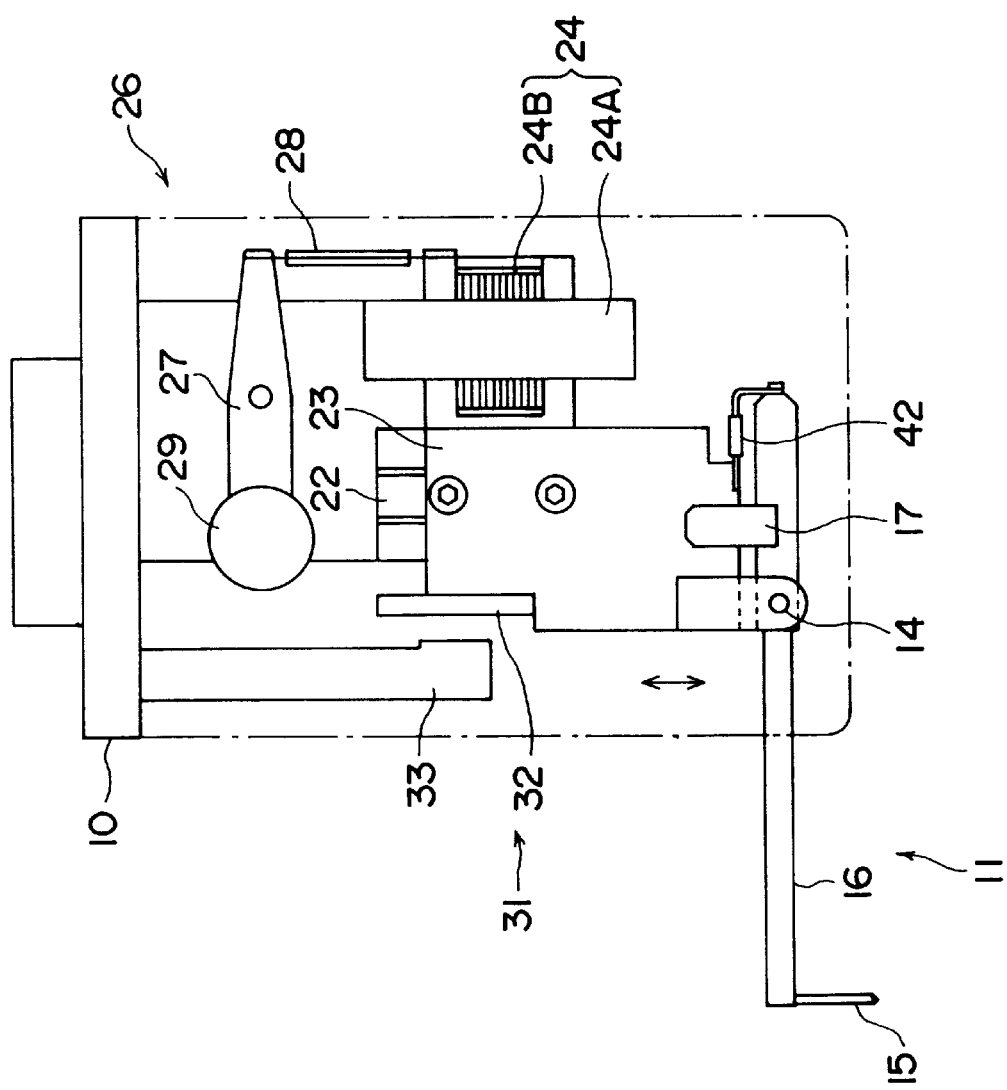
FIG. 8 is an illustration showing an example of a probe being linearly movably supported in a direction orthogonal with the longitudinal direction thereof.

Though the probe 11 is swingably supported by the frame 10, the first lever 13 may be, for instance, integrated to the movable member 23 and the lever 16 (probe 11) may be movably supported in a longitudinal direction of the scale 32, as shown in FIG. 8.

In other words, the lever 16 is supported by the movable member 23 through a lever rotation shaft 14 and the actuator 24 is driven so that the measuring force detected value applied to the lever 16 (probe 11) is equal to the measuring force command value based on the output of the strain gauge 42.

Consequently, the lever 16 (probe 11) is controlled to always keep constant posture during measurement. Accordingly, since the lever 16 (probe 11) vertically moves in parallel tracking height change of the workpiece 1 when the tracer 15 is moved along the surface of the workpiece 1, influence of arc error in the above embodiment can be eliminated. Further, in the above arrangement, since the lever rotation shaft 14 is directly fixed to the movable member 23, the arrangement can be made simpler than the bearing mechanism of the above embodiment. Further, since the link 25 in the above embodiment is not required, i.e., the number of the component can be decreased, the measuring machine can be manufactured inexpensively and in compact size.

The second lever 16 in the above embodiment can be configured exchangeable. For instance, as shown in FIG. 9, the second lever 16 may be composed of square-tube first member 16A swingably supported by the second lever rotation shaft 14, second member 16B provided attachably to the first member 16A and having the tracer 15 at an end thereof and a plate spring 16C for pressing the second member 16B to the first member 16A while the second member 16B being inserted into the first member 16A. Accordingly, the measurement can be conducted while changing the second member 16B having a different length as necessary.

The arrangement of the measuring force controller 21, the displacement detector 31, and the measuring force detector 41 are not restricted to the arrangement described in the above embodiment, but may be another arrangement.

For instance, the measuring force controller 21 may be an actuator using fluid as long as the measuring force applied to the probe 11 can be changed. Any arrangement is possible for the displacement detector 31 as long as measurement with high resolution can be conducted with a wide measurement range.

The measuring force detector 41 may be a spring of which length changes in accordance with measuring force, and the measuring force may be detected by the deformation amount of the spring.

What is claimed is:

1. A surface-tracking measuring machine, comprising:
a main body movable relative to a workpiece;
a probe displaccably supported by the main body and having a tracer at an end thereof;
a measuring force controller for controlling a measuring force applied to the probe;
a displacement detector for detecting a displacement of the probe;
a measuring force detector for detecting the measuring force applied to the probe;
a controller for comparing a measuring force detected value detected by the measuring force detector and a previously commanded measuring force command value to control the measuring force detected value to be equal to the measuring force command value;
wherein a mechanical path for connecting the tracer and the measuring force controller is provided between the tracer and the measuring force controller so that positions of the tracer and the measuring force controller are relatively changeable, the measuring force detector being a strain gauge disposed in the path.

2. The surface-tracking measuring machine according to claim 1, the probe further comprising a first lever swingably supported by the main body through a first lever rotation shaft and a second lever swingably supported by the first lever at an intermediate portion thereof through a second lever rotation shaft disposed coaxially with the first lever rotation shaft, the second lever having the tracer at an end thereof, a rear end of the second lever and the first lever being connected by a connecting member.

3. The surface-tracking measuring machine according to claim 2, wherein the second lever is swingably supported by the first lever through the second lever rotation shaft at a centroid position thereof.

4. The surface-tracking measuring machine according to claim 2, wherein the connecting member is the strain gauge constituting the measuring force detector.

5. The surface-tracking measuring machine according to claim 2, wherein the measuring force controller includes a movable member slidably provided to the main body and connected to the first lever and an actuator for sliding the movable member.

6. The surface-tracking measuring machine according to claim 5, wherein the displacement detector has a scale attached to the movable member and a detector fixed to the main body opposite to the scale retaining a predetermined gap therebetween.

7. The surface-tracking measuring machine according to claim 6, further comprising a balancing device for canceling at least a weight of the movable member and the scale.

8. The surface-tracking measuring machine according to claim 7, wherein the balancing device includes a counterbalance having a weight at least corresponding to the weight of the movable member and the scale, the counterbalance being configured to be movable in a direction opposite to a sliding direction of the movable member.

9. The surface-tracking measuring machine according to claim 1, wherein the probe further comprises a lever swingably supported by the main body through a lever rotation shaft at a centroid position thereof and having the tracer at an end thereof, a rear end of the lever and the measuring force controller being connected by a connecting member, the connecting member being the measuring force detector.

10. The surface-tracking measuring machine according to claim 9, wherein the measuring force controller includes a movable member slidably provided to the main body and connected to the lever and an actuator for sliding the movable member.

11. The surface-tracking measuring machine according to claim 10, wherein the displacement detector has a scale attached to the movable member and a detector fixed to the main body opposite to the scale retaining a predetermined gap therebetween.

12. The surface-tracking measuring machine according to claim 11, further comprising a balancing device for canceling at least a weight of the movable member and the scale.

13. The surface-tracking measuring machine according to claim 12, wherein the balancing device includes a counterbalance having a weight at least corresponding to the weight of the movable member and the scale, the counterbalance being configured to be movable in a direction opposite to a sliding direction of the movable member.

14. The surface-tracking measuring machine according to claim 9, wherein the connecting member has a L-shaped configuration.

15. A surface-tracking measuring machine, comprising:
a main body movable relative to a workpiece;
a probe displaccably supported by the main body and having a tracer at an end thereof;
a measuring force controller for controlling a measuring force applied to the probe;
a displacement detector for detecting a displacement of the probe;
a measuring force detector for detecting the measuring force applied to the probe; and
a controller for comparing a measuring force detected value detected by the measuring force detector and a previously commanded measuring force command value to control the measuring force detected value to be equal to the measuring force command value;
wherein the probe includes a first lever swingably supported by the main body through a first lever rotation shaft and a second lever swingably supported by the first lever at an intermediate portion thereof through a second lever rotation shaft disposed coaxially with the first lever rotation shaft, the second lever having the tracer at an end thereof, a rear end of the second lever and the first lever being connected by a connecting member.

16. The surface-tracking measuring machine according to claim 15, wherein the measuring force controller includes a movable member slidably provided to the main body and connected to the first lever and an actuator for sliding the movable member.

17. The surface-tracking measuring machine according to claim 16, wherein the displacement detector has a scale attached to the movable member and a detector fixed to the main body opposite to the scale retaining a predetermined gap therebetween.

18. The surface-tracking measuring machine according to claim 17, further comprising a balancing device for canceling at least a weight of the movable member and the scale.

19. The surface-tracking measuring machine according to claim 18, wherein the balancing device includes a counterbalance having a weight at least corresponding to the weight of the movable member and the scale, the counterbalance being configured to be movable in a direction opposite to a sliding direction of the movable member.

20. The surface-tracking measuring machine according to claim 15, wherein the second lever is swingably supported by the first lever through the second lever rotation shaft at a centroid position thereof.

21. The surface-tracking measuring machine according to claim 15, wherein the containing member is a strain gauge constituting the measuring force detector.

22. A surface-tracking measuring machine, comprising:
a main body movable relative to a workpiece;
a probe displaceably supported by the main body and having a tracer at an end thereof;
a measuring force controller for controlling a measuring force applied to the probe;
a displacement detector for detecting a displacement of the probe;
a measuring force detector for detecting the measuring force applied to the probe; and
a controller for comparing a measuring force detected value detected by the measuring force detector and a previously commanded measuring force command value to control the measuring force detected value to be equal to the measuring force command value;
wherein the probe includes a lever swingably supported by the main body through a lever rotation shaft at a centroid position thereof and having the tracer at an end thereof, a rear end of the lever and the measuring force controller being connected by a connecting member.

23. The surface-tracking measuring machine according to claim 22, wherein the measuring force controller includes a movable member slidably provided to the main body and connected to the lever and an actuator for sliding the movable member.

24. The surface-tracking measuring machine according to claim 23, wherein the displacement detector has a scale attached to the movable member and a detector fixed to the main body opposite to the scale retaining a predetermined gap therebetween.

25. The surface-tracking measuring machine according to claim 24, further comprising a balancing device for canceling at least a weight of the movable member and the scale.

26. The surface-tracking measuring machine according to claim 25, wherein the balancing device includes a counterbalance having a weight at least corresponding to the weight of the movable member and the scale, the counterbalance being configured to be movable in a direction opposite to a sliding direction of the movable member.

27. The surface-tracking measuring machine according to claim 22, wherein the connecting member has a L-shaped configuration.

* * * * *